Feb. 16, 1932. O. H. REEDER ET AL 1,845,765
DEFORMATION STABILIZING, ESPECIALLY FOR PISTONS
Filed May 13, 1929
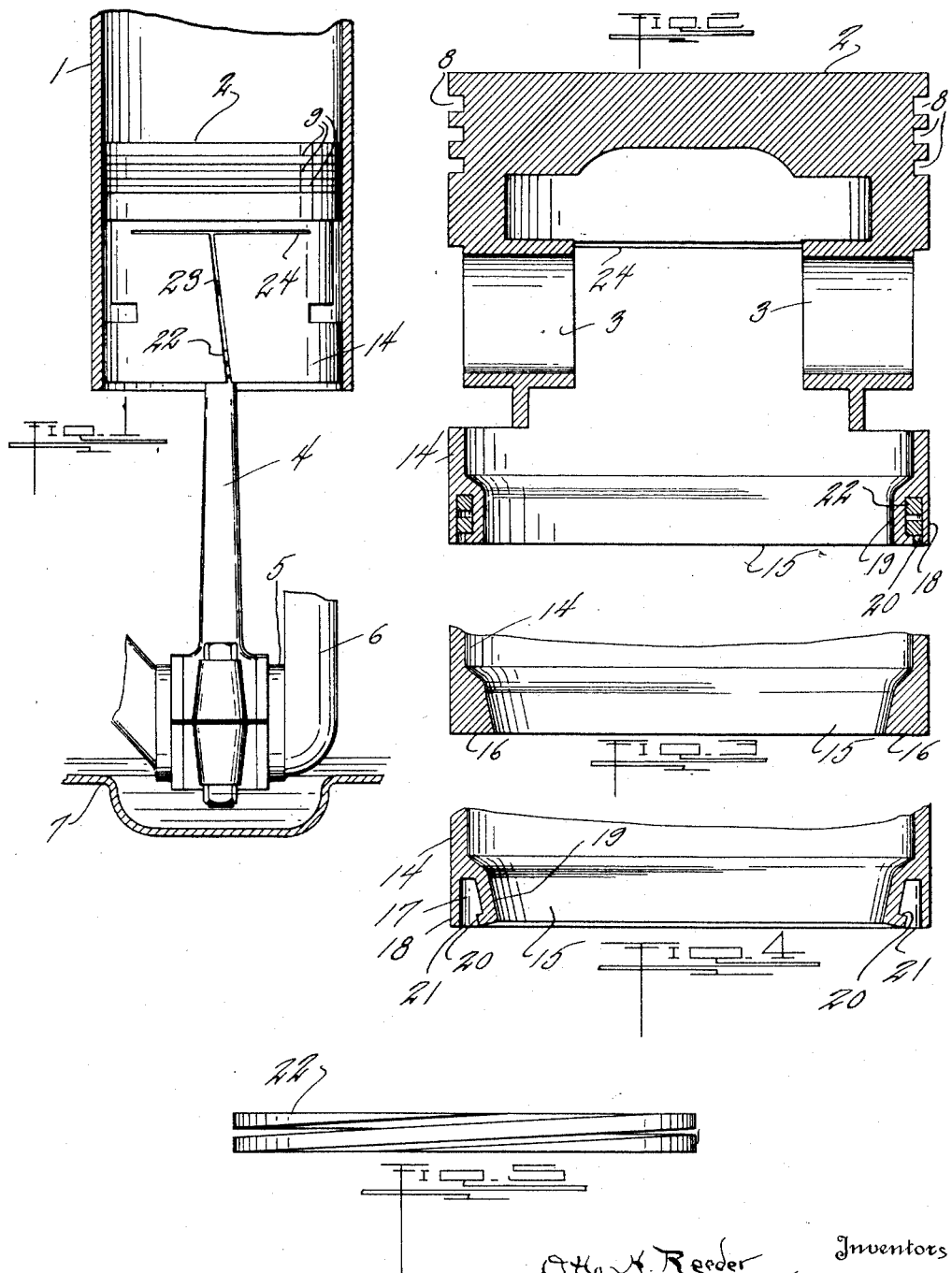

Patented Feb. 16, 1932

1,845,765

UNITED STATES PATENT OFFICE

OTTO H. REEDER AND DENT SANDFORD, OF TOLEDO, OHIO

DEFORMATION STABILIZING, ESPECIALLY FOR PISTONS

Application filed May 13, 1929. Serial No. 362,616.

This invention relates to configuration control for tubular members.

This invention has utility when incorporated in pistons, as for internal combustion motors, compressors and pumps.

Referring to the drawings:

Fig. 1 is a fragmentary view of a motor having an embodiment of the invention incorporated in the piston thereof;

Fig. 2 is a section on an enlarged scale of the piston of Fig. 1;

Fig. 3 is a fragmentary view of the piston terminus before the groove has been formed therein;

Fig. 4 is a view similar to Fig. 3, with the groove formed therein for receiving the helix control member; and Fig. 5 is a side elevation of the helix control member for the piston.

Cylinder 1, say for internal combustion motor, is shown as having therein piston 2 having bearings 3 for wrist pin, from which extends connecting rod 4 to crank bearing 5 on crank 6 of a crank shaft, operable in crank case or pan 7, herein shown as involving splash type of lubrication, although force feed or other type may be used.

This piston 2 is shown as provided with external grooves 8 for piston rings 9.

The piston is shown as provided with skirt 14 herein shown as having at open end 15, reinforcing or thickened portion 16 which, in the carrying out of the invention herein, is hollowed out to form groove 17 having straight outer wall 18, inwardly tapered inner wall 19 to outwardly extending overhang 20 with throat 21 axially open as to the skirt extent and about the open end 15 as a way for the insertion of two-pitch helical member 22.

Before the insertion of this member 22, it is desirable, in the slotted skirt type of piston structure wherein the piston is of a metal of a high coefficient of expansion, to form slots 23, 24, in such skirt as may be desired, to preclude excessive expansion of this metal, of a higher coefficient of expansion than the cylinder, and than the steel or ferrous metal member 22.

The non-ferrous piston say of aluminum or aluminum alloy may have inserted through the axial opening 21, member 22 as overlapping in its annular extent. As so inserted in the slotted piston skirt, the reinforcing portion 16, as having the groove 17 therein, may be expanded to bring the overhang 20 into locking or retaining position as to the member 22.

As thus assembled, the light mass, high coefficient of expansion piston has circular configuration stability against deformation imparted thereto by the helix 22 jointless beyond a 360° extent, thereby providing continuity past any slots 23. Furthermore, this lower coefficient of expansion member 22 has a circular stability against flattening or oval deformation, thereby materially contributing to holding the skirt 14 cylindrical or to initial form in the cylinder 1, even against tendencies to tilt in the cylinder due to explosive thrusts or compression tendencies. This is a factor in cylinder upkeep as well as piston life and motor efficiency, as slapping or knocking from piston tilting or leakage from non-circular wear is effectively minimized if not fully eliminated by this independent relatively annularly shiftable member 22.

What is claimed and it is desired to secure by Letters Patent is:

1. Apparatus for stabilizing the configuration of a deformable tubular member, there being a groove in the member open axially of the member and with an overhang, and a member in the groove continuous for overlapping on itself, the overhang being effective for locking the stabilizing member in the groove.

2. Apparatus for stabilizing the configuration of a slotted skirted piston, there being terminally thereof a groove open axially of the piston with an overhang longitudinally of the groove, and a helical member mounted in said groove and of a lower coefficient of expansion than the piston, the overhang providing a side for the groove effective for retaining the helical member in the groove.

3. A slotted skirt piston having terminally a channel forming a groove with an overhang, and helical means in the groove retained by said overhang.

4. A slotted skirt piston having terminally a channel forming a groove with an inner wall having an outwardly extending overhang, and a helical member of a plurality of convolutions locked in the groove by said overhang.

In witness whereof we affix our signatures.
OTTO H. REEDER.
DENT SANDFORD.